US012613980B2

(12) United States Patent
Paklin et al.

(10) Patent No.: US 12,613,980 B2
(45) Date of Patent: Apr. 28, 2026

(54) SECURE CONTENT ENCRYPTION AND DISTRIBUTION

(71) Applicant: NVIDIA Corporation, Santa Clara, CA (US)

(72) Inventors: Maxim Paklin, San Jose, CA (US); Michael Beiter, Athol, ID (US); Bojan Vukojevic, Pleasanton, CA (US)

(73) Assignee: NVIDIA Corporation, Santa Clara, CA (US)

( * ) Notice: Subject to any disclaimer, the term of this patent is extended or adjusted under 35 U.S.C. 154(b) by 78 days.

(21) Appl. No.: 18/391,179

(22) Filed: Dec. 20, 2023

(65) Prior Publication Data

US 2025/0209183 A1      Jun. 26, 2025

(51) Int. Cl.
  *G06F 21/60*          (2013.01)
  *H04L 9/08*           (2006.01)
(52) U.S. Cl.
  CPC .......... *G06F 21/602* (2013.01); *H04L 9/0869* (2013.01)
(58) Field of Classification Search
  CPC ............................ G06F 21/602; H04L 9/0869
  See application file for complete search history.

(56) References Cited

U.S. PATENT DOCUMENTS

| | | | | | |
|---|---|---|---|---|---|
| 11,995,198 | B1* | 5/2024 | Kim | ...................... | G06F 21/602 |
| 2018/0063105 | A1* | 3/2018 | Poon | ..................... | H04L 63/123 |
| 2018/0173887 | A1 | 6/2018 | Paulovicks et al. | | |
| 2020/0195433 | A1* | 6/2020 | Collier | ................... | G06F 21/602 |
| 2023/0246845 | A1* | 8/2023 | Peddada | ............... | H04L 9/0894 |
| | | | | | 713/176 |
| 2023/0393946 | A1* | 12/2023 | Barui | .................... | H04L 9/0894 |
| 2024/0126915 | A1* | 4/2024 | Ito | ......................... | H04L 9/3093 |

OTHER PUBLICATIONS

Non-Final Office Action, U.S. Appl. No. 18/391,454, Notification Date: Jun. 30, 2025, 19 pages.
Notice of Allowance, U.S. Appl. No. 18/391,454, Notification Date: Jan. 6, 2026, 8 pages.

* cited by examiner

*Primary Examiner* — Sangseok Park
(74) *Attorney, Agent, or Firm* — Freestone Intellectual Property Law PLLC

(57) ABSTRACT

In various examples, a file such as one representing a game build may be encrypted using a (e.g., randomly generated) content-encryption key, and the content-encryption key may be encrypted using a key-encryption key. The encrypted content-encryption key may be included in the encrypted file (e.g., as metadata), and an identifier associated with the key-encryption key may be included in the encrypted file (e.g., as part of an entropy tag appended to the filename). As such, the encrypted file may be securely distributed (e.g., via a content distribution network). Taking an encrypted game build for cloud gaming as an example, a game developer may encrypt a game build (e.g., as an encrypted disk) and distribute the encrypted build through an interface such as a developer portal of a cloud gaming platform, which may distribute the encrypted build to various data centers and/or geographic zones of the cloud gaming platform.

20 Claims, 7 Drawing Sheets

200

PUBLIC KEY 110 FOR KEY ENCRYPTION

GAME DEVELOPER PORTAL 220

ENCRYPTION COMPONENT 125

ENCRYPTED BUILD 237

GAME BUILD DISTRIBUTOR 240

145

SECRET STORE 105

ZONE 150

PROVISION MANAGER 160

155

PRIVATE KEY 115 FOR KEY DECRYPTION

VIRTUAL MACHINE 170

GAME SEAT 295

DECRYPTION COMPONENT 175

BUILD MOUNTING COMPONENT 290

300

ENCRYPT A FILE USING A CONTENT-ENCRYPTION
KEY TO GENERATE AN ENCRYPTED FILE
B302

ENCRYPT THE CONTENT-ENCRYPTION KEY USING A
PUBLIC KEY-ENCRYPTION KEY TO GENERATE AN
ENCRYPTED CONTENT-ENCRYPTION KEY
B304

ATTACH THE ENCRYPTED CONTENT-ENCRYPTION KEY
AND A KEY IDENTIFIER OF THE PUBLIC KEY-ENCRYPTION
KEY TO THE ENCRYPTED FILE
B306

400

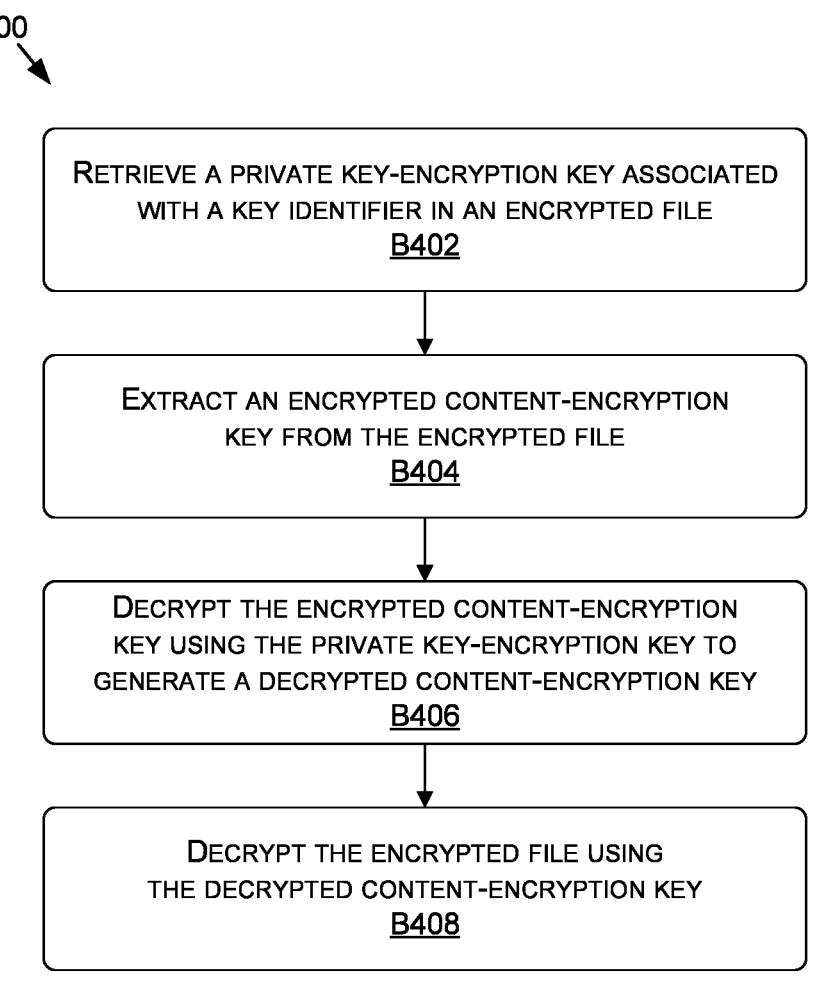

RETRIEVE A PRIVATE KEY-ENCRYPTION KEY ASSOCIATED
WITH A KEY IDENTIFIER IN AN ENCRYPTED FILE
B402

EXTRACT AN ENCRYPTED CONTENT-ENCRYPTION
KEY FROM THE ENCRYPTED FILE
B404

DECRYPT THE ENCRYPTED CONTENT-ENCRYPTION
KEY USING THE PRIVATE KEY-ENCRYPTION KEY TO
GENERATE A DECRYPTED CONTENT-ENCRYPTION KEY
B406

DECRYPT THE ENCRYPTED FILE USING
THE DECRYPTED CONTENT-ENCRYPTION KEY
B408

FIGURE 4

500
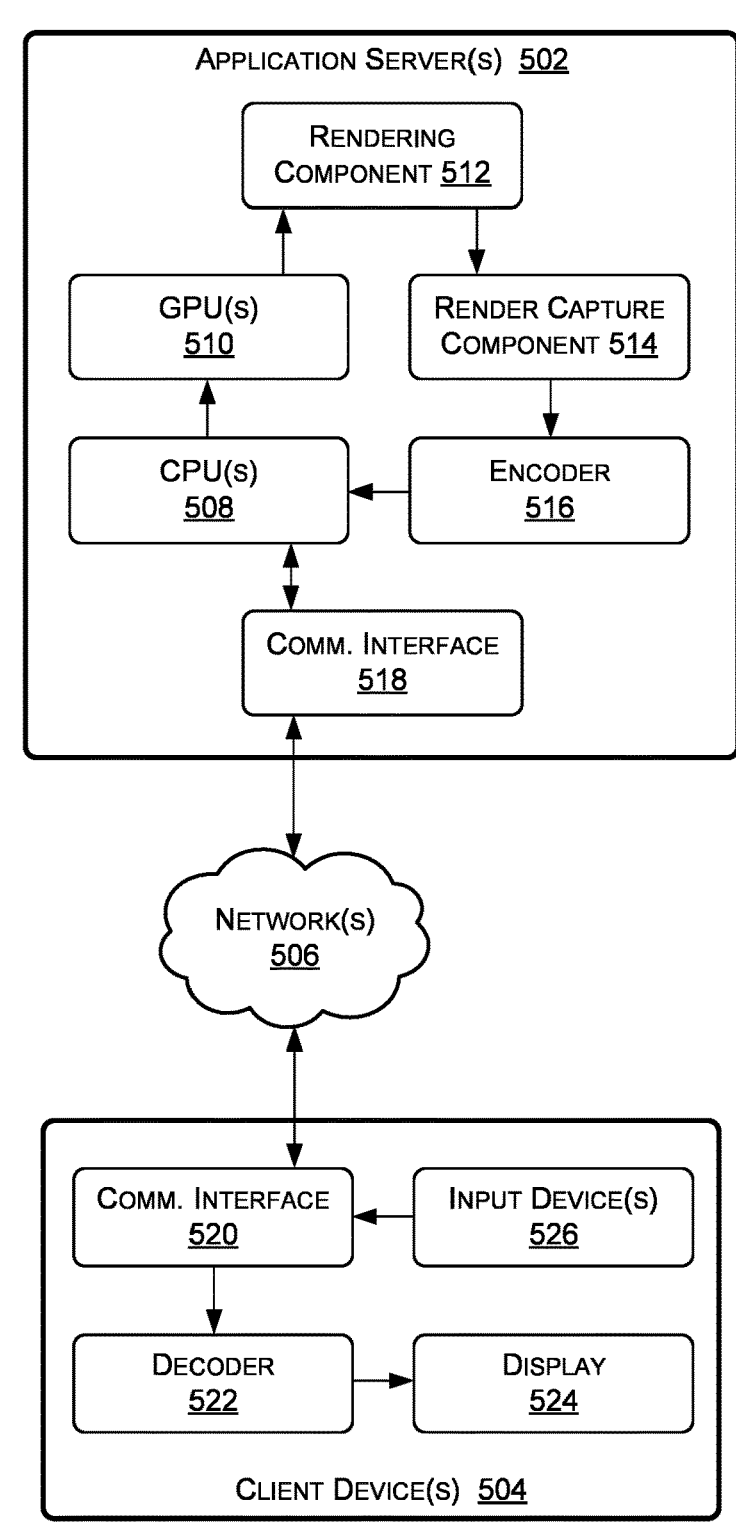
FIGURE 5

600

MEMORY
604

I/O COMPONENTS
614

CPU(S)
606

POWER SUPPLY
616

GPU(S)
608

PRESENTATION
COMPONENT(S)
618

COMM. INTERFACE
610

LOGIC UNIT(S)
620

I/O PORT(S)
612

602

700

SECURE CONTENT ENCRYPTION AND DISTRIBUTION

BACKGROUND

Content encryption often plays an important role in data distribution networks such as Content Distribution Networks (CDNs). Generally, CDNs may be responsible for distributing various types of digital content, such as websites, videos, and/or applications. By encrypting data, CDNs can protect data from disclosure or interception, prevent unauthorized tampering, guard against potential attacks, safeguard sensitive user information, and/or ensure compliance with data security standards and regulations. As such, encryption can provide an important security measure that promotes data privacy, integrity, and compliance, enhancing the overall trust and reliability of CDNs and other data distribution networks.

Public-private key encryption, also known as asymmetric encryption, typically operates using a pair of keys—a public key and a private key. The public key is openly shared and is used to encrypt data, while the private key is kept confidential and is used for decryption. When someone wishes to send an encrypted message to another party, they can use the recipient's public key to encrypt the message. This encrypted data can only be decrypted by the recipient who holds the corresponding private key, ensuring that the message remains confidential and secure during transmission. In conventional CDNs, whichever entity owns or manages the encryption process (e.g., the content owner) typically uses one key pair (e.g., whether one version or some number of different versions used in parallel) for all its encryption needs, and all the data is encrypted and decrypted using the same key pair. There is often a central repository where the key pair is stored and managed. However, that central repository can become a focal point for an attacker, potentially compromising data security. As such, there is a need for improved techniques for content encryption and distribution.

SUMMARY

Embodiments of the present disclosure relate to secure content encryption and distribution. Systems and methods are disclosed that encrypt, distribute, and/or decrypt content with an attached encrypted content key that was used to encrypt the content and/or an identifier for a key-encryption key that was used to encrypt the content key.

In contrast to conventional systems, such as those described above, embodiments of the present disclosure are directed to a solution for secure content distribution in which the content (e.g., a file or container, such as one representing a data disk) may be encrypted using a (e.g., randomly generated) content-encryption key, that content-encryption key may be encrypted using a key-encryption key (e.g., public key of a public-private key pair), the encrypted content-encryption key may be attached to (encoded with) the encrypted content as metadata, and an identifier for the key-encryption key (e.g., the public-private key pair) may be included in the filename of the encrypted content. As such, the encrypted content may be distributed with the (e.g., encrypted) content-encryption key and the identifier for the key-encryption key. Accordingly, an authorized recipient may use the identifier to retrieve the key-encryption key (e.g., the corresponding private key of the public-private key pair), which itself may be used to decrypt the content-encryption key, and the decrypted content-encryption key may be used to decrypt the content.

Taking an encrypted game build for cloud gaming as an example, a game developer may encrypt a game build (e.g., as an encrypted disk image) and distribute the encrypted build through an interface such as a developer portal of a cloud gaming platform, which may distribute the encrypted build to various data centers and/or geographic zones of the cloud gaming platform. When an authorized cloud gaming user initiates gameplay of the game corresponding to that build, the cloud gaming platform may allocate a virtual machine for the game on a server in a data center, decrypt, attach, and mount the build (e.g., as a block device or other virtual data disk) using the decrypted content-encryption key extracted from the encrypted game build. Accordingly, the game build may be installed and hosted for the cloud gaming user without the need to distribute the game build to the end user-thereby avoiding the risk of exposing the game build data to unauthorized tampering and/or redistribution.

BRIEF DESCRIPTION OF THE DRAWINGS

The present systems and methods for secure content encryption and distribution are described in detail below with reference to the attached drawing figures, wherein:

FIG. 4 is a flow diagram illustrating a method of content decryption, in accordance with some embodiments of the present disclosure;

FIG. 5 is a block diagram of an example content streaming system suitable for use in implementing some embodiments of the present disclosure;

DETAILED DESCRIPTION

Figure 1:
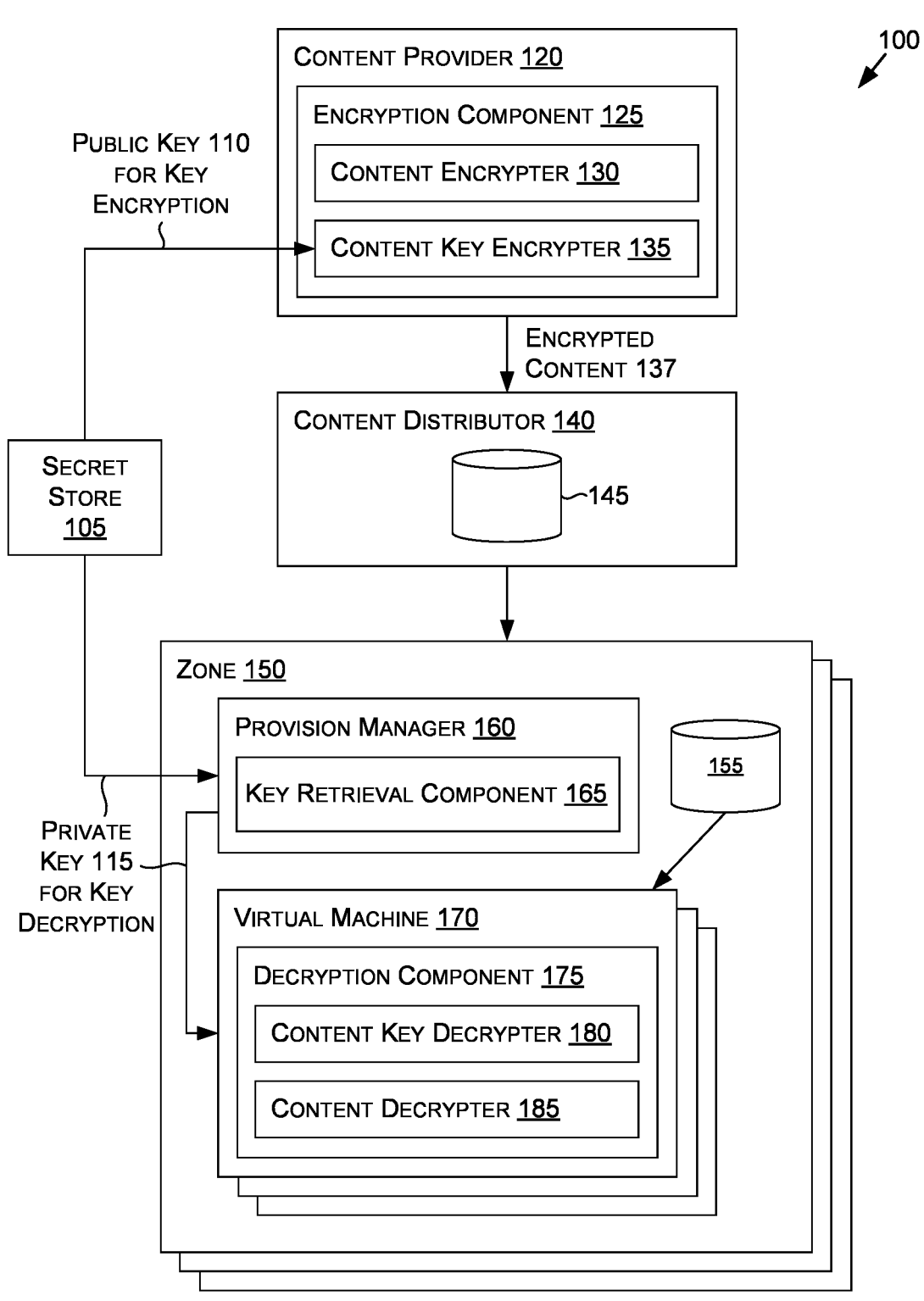
FIG. 1 is a block diagram of an example content distribution system, in accordance with some embodiments of the present disclosure.

Systems and methods are disclosed related to secure content encryption and distribution. In some embodiments, content (e.g., a file or container, such as one representing a data disk) may be encrypted using a (e.g., randomly generated) content-encryption key, that content-encryption key may be encrypted using a key-encryption key (e.g., public key of a public-private key pair), the encrypted content-encryption key may be attached to (e.g., encoded with) the encrypted content as metadata, and an identifier for the key-encryption key (e.g., the public-private key pair) may be included in the filename of the encrypted content. As such, the encrypted content may be distributed with the (e.g., encrypted) content-encryption key and the identifier for the key-encryption key. Accordingly, an authorized recipient may use the identifier to retrieve the key-encryption key (e.g., the corresponding private key of the public-private key pair), which itself may be used to decrypt the content-encryption key, and the decrypted content-encryption key may be used to decrypt the content.

One possible application in which the present techniques may be used is in game distribution, where games are represented as builds. A game build may encapsulate a distinct version of a video game in a disk file representing a virtual data disk (e.g., a Virtual Hard Disk 2.0 (VHDx) file for WINDOWS®, an IMG file for LINUX®) for distribution and/or testing. Often times, released and unreleased games undergo further development and changes, and developers create various builds to manage and share their progress. Game builds may be used for various purposes. For example, development builds may be used for debugging, alpha builds may be used for initial testing, beta builds may be used to solicit broader feedback, release candidates or sneak peaks may be used for near-final versions, gold builds may be used for official releases, and patch or update builds may be used for post-release improvements. As such, each build may reflect a game's state at a particular stage of development and may be used to gather feedback or deliver new content to players.

In an example scenario, a content owner (e.g., a game developer) may want to test unreleased or private games or other premature or otherwise sensitive applications. To protect the content from leaking, the content owner may seek to provide an encrypted version of the content that can only be accessed at runtime by authorized users and cannot be accessed by anyone else, such as personnel or distribution channels handling or distributing the content. In the context of cloud gaming—also known as game streaming or cloud gaming services—operators or cloud service providers of a cloud gaming title typically host video games on remote servers located in data centers. During an active gaming session, the graphical output generated during the application session is streamed over a network communication channel back to the user. In one or more embodiments unreleased or private content may be hosted in the cloud without the need to distribute the game builds to the end users (e.g., testers).

Taking an encrypted game build for cloud gaming as an example, a game developer (or an operator of a cloud gaming platform or other distribution network) may encrypt a particular build (e.g., as an encrypted disk) and distribute the encrypted build (e.g., through an interface such as a developer portal of a cloud gaming platform, to various data centers and/or geographic zones of the cloud gaming platform or other distribution network). When an authorized cloud gaming user initiates gameplay of the game corresponding to that build, the cloud gaming platform may allocate a virtual machine for the game on a server in a data center, extract the identifier for the key-encryption key from the filename of the encrypted build, use the identifier to retrieve the private key-encryption key, extract the encrypted content-encryption key from the metadata of the encrypted build, and use the retrieved private key-encryption key to decrypt the extracted content-encryption key. As such, the virtual machine (e.g., a game seat) may decrypt, attach, and mount the build (e.g., as a block device or other virtual data disk) using the decrypted content-encryption key. Accordingly, the game build may be installed and executed on the virtual machine without the need to distribute the game build to the end user (e.g., tester).

In some embodiments, the filename of the encrypted file (e.g., an encrypted game build) may be appended with an entropy tag comprising a flag indicating whether the file is encrypted, the identifier for the key-encryption key used to encrypt the content-encryption key, and/or a random component (e.g., a random number). The flag may be used by an authorized recipient service as an indication that the file is encrypted, which may trigger the recipient service to extract the identifier for the key-encryption key. Each file (e.g., each game build) may be encrypted using a different content-encryption key, which may travel with the file (e.g., as encrypted metadata). As such, the (e.g., metadata of the) file itself may indicate which content-encryption key was used to encrypt the content, so there is no need for a central repository to track the association between encrypted files and corresponding content-encryption keys, which removes a potential focal point for attackers and reduces the number of failure points in such a distributed system. Furthermore, in some embodiments, since the identifier of the key-encryption key—and not the key-encryption key itself—travels with the file (e.g., as part of the filename), the key-encryption key may be stored in a secrets store, managed, and/or rotated using any known technique. As such, the (e.g., filename of the) file itself may indicate which key-encryption key was used to encrypt the content-encryption key for the file, independent of the state or method of key rotation, so there is no need for a central repository to track the association among key-encryption keys, content-encryption keys, and/or encrypted files. This, too, eliminates a potential focal point for attackers and reduces the number of failure points in such a distributed system. Finally, storing the encrypted file in a file system configured to suppress a file directory listing would effectively require an authorized recipient to know the filename in order to access the file, and including a random component in the filename makes the filename virtually impossible to guess, further improving data security by adding a layer of access authorization into file systems without additional management overhead, and extending such access control into file systems that may support such a security control natively.

As such, the techniques described herein may be utilized to encrypt and distribute files such as those representing game builds. Embodiments that embed (e.g., an encrypted) content-encryption key in (e.g., the metadata of) the file it was used to encrypt avoid the need to track associations between files and corresponding content-encryption keys in a central repository. Additionally or alternatively, embodiments that embed an identifier for a key-encryption key in (e.g., the filename of) the file avoid the need to track associations between content-encryption keys and corresponding key-encryption keys in a central repository. As such, the present techniques effectively improve data security for content encryption and distribution applications, such as those that distribute or host unreleased or private games in a cloud gaming platform.

With reference to FIG. 1, FIG. 1 is an example content distribution system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

In FIG. 1, the content distribution system 100 includes a content provider 120 that may generate and provide encrypted content 137 to a content distributor 140 (e.g., over one or more networks). In some embodiments, the content distributor 140 may be part of a content distribution network such as one hosted at least in part by one or more data centers comprising one or more zones (e.g., zone 150), and the content distributor 140 may distribute the encrypted content 137 to the various zones (e.g., a secure data store 155 in the zone 150). At a high level, an encryption component 125 (e.g., of the content provider 120) may generate a content-encryption key (e.g., a random number), encrypt content using the content-encryption key, use a key-encryption key (e.g., a public key 110 for key encryption) to encrypt the content-encryption key, and attach (encode) the encrypted content key and/or an identifier for the key-encryption key (e.g., a key ID) to the encrypted content 137. As such, an authorized recipient of the encrypted content 137 (e.g., a provision manager 160 configured to provision the zone 150 with resources) may extract the identifier for the key-encryption key and/or the decrypted content-encryption key from the encrypted content 137, use the identifier (e.g., key ID) to retrieve the applicable key-encryption key (e.g., a private key 115 for key decryption), and use the key-encryption key to decrypt the decrypted content-encryption key. As such, the content-encryption key may be used (e.g., by a virtual machine 170 provisioned by the provision manager 160) to decrypt the encrypted content 137 and, in one or more embodiments, to serve the decrypted content to an authorized user.

Figure 6:
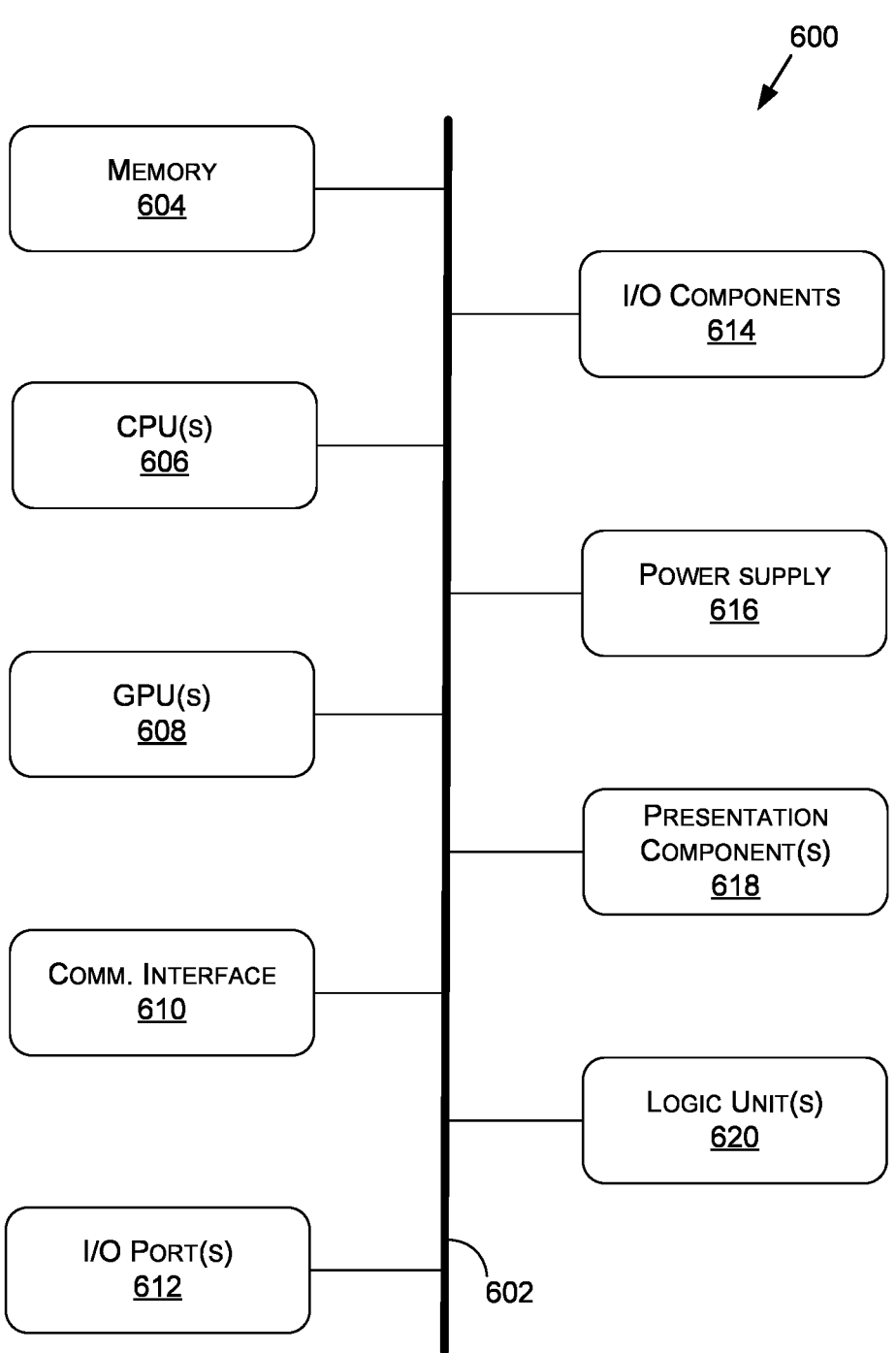
FIG. 6 is a block diagram of an example computing device suitable for use in implementing some embodiments of the present disclosure.

Generally, an owner or provider of any type of electronic content may use the content provider 120 (which, as with other components described here, may include similar components, features, and/or functionality to the example computing device 600 of FIG. 6) to access or generate content. In some embodiments, the content provider 120 may include some functionality (e.g., one or more interfaces such as one application programming interfaces (APIs), developer portals, etc.) associated with a content distribution network. As such, the content provider 120 may be used to access or develop any type of electronic content (e.g., text content such as documents, articles, blogs, e-books, or digital publications; audio content such as podcasts, music tracks, or audiobooks; video content such as clips, movies, or TV shows; interactive content such as video games or mobile apps; visual content such as images, illustrations, or photographs; educational content such as online courses, tutorials, or webinars; virtual reality (VR) or augmented reality (AR) content; etc.) using any known technique. The content provider 120 may receive, generate, and/or package the electronic content in any known file format, container, and/or storage method. For example, electronic content may be represented in one or more files (e.g., text files, audio files, video files, disk files, compressed files, application files, container files, and/or otherwise).

In some embodiments, the content provider 120 may be provisioned with an encryption component 125 that encrypts the electronic content. In the embodiment illustrated in FIG. 1, the encryption component 125 includes a content encrypter 130 and a content key encrypter 135. At a high level, the content encrypter 130 may encrypt electronic content using a content-encryption key, and the content key encrypter 135 may encrypt the content-encryption key. In some embodiments, the content encrypter 130 may generate the content-encryption key randomly (e.g., as a random number, passphrase, salt, or other random data). The type of encryption key and/or encryption technique used by the content encrypter 130 may depend on the type of file or container storing the electronic content to be encrypted. Taking an example scenario in which the electronic content is stored in a disk file representing a virtual data disk (e.g., a VHDx file for WINDOWS, an IMG file for LINUX), the content encrypter 130 may use any known disk encryption technique, such as BITLOCKER® for WINDOWS, or cryptsetup or Linux Unified Key Setup (LUKS) for LINUX. In this example, the encrypted content 137 may take the form of an encrypted disk file (e.g., representing an encrypted block device or other encrypted virtual disk).

In some embodiments, the content key encrypter 135 may encrypt the content-encryption key used to encrypt the encrypted content 137. For example, a public-private key pair managed by the secret store 105 may be used to encrypt and decrypt the content-encryption key. Generally, the secret store 105 may employ any known secrets management and storage technique. One example secrets management service is HASHICORP® Vault, which manages the secret store 105 in association with a Vault agent configured on a recipient client device (e.g., the encryption component 125, the provision manager 160). For example, the content key encrypter 135 may trigger the secret store 105 (e.g., Vault) to generate a public-private key pair and/or retrieve the public key 110 for key encryption. As such, the content key encrypter 135 may use the public key 110 to encrypt the content-encryption key that was used to encrypt the encrypted content 137. Note that although the embodiment in FIG. 1 is illustrated with a single secret store 105 for key-encryption key(s), this need not be the case. For example, any number of key encryption keys (e.g., any number of private keys associated with any number of public keys) for any number of pieces of content, content providers, content distributors, etc. may be managed and/or stored using any number of instances of a password vault (e.g., a Hardware Security Module (HSM), Self-Storage Management (SSM), security module), whether controlled by the content provider, content distributor, or otherwise. One advantage of using a public/private key scheme is that whoever encrypts the data does not need the private key for encryption. As such, management of the public key may occur independently of management of and/or access control to the private key.

In some embodiments, the encryption component 125 may encode or otherwise attach a representation of the resulting encrypted content-encryption key (e.g., an encoded version generated by the encryption component 125, for example, using base64URL or some other kind of encoding scheme) to the encrypted content 137. For example, the encryption component 125 may encode or otherwise attach a representation of the encrypted content-encryption key to the encrypted content 137 as metadata. For example, some file formats include a metadata region that stores one or more metadata fields, tags, attributes, tables, and/or other types of metadata, and the encryption component 125 may store a representation of the encrypted content-encryption key in the metadata region of the encrypted content 137. In some such embodiments, no other system carries the encrypted content-encryption key, which allows every piece of content (e.g., each file) to be encrypted with a different (e.g., random) content-encryption key that may remain associated with the encrypted content 137 (e.g., as part of the file metadata, disk metadata, block device metadata, etc.).

In some embodiments, the public-private key pair stored in and/or maintained by the secret store 105 may be unique to each piece of content (e.g., each file, each game build) and may be associated with a unique identifier (a "key ID"). The key ID may be random or structural (e.g., the first two characters may denote an owner of the key, then subsequent characters denote a date code, etc.). In some embodiments, the encryption component 125 may encode or otherwise attach the key ID for the public key 110 used to encrypt the content-encryption key for a particular piece of content to that content (e.g., the encrypted content 137). For example, the encryption component 125 may append the key ID to (or otherwise include the key ID in) the filename (or metadata) of the encrypted content 137 (e.g., the name of a block device, VHDx file, etc.). In some embodiments, the encryption component 125 may append or otherwise include in the filename (or metadata) a flag with a corresponding value(s) or character(s) indicating whether or not the file is encrypted, and/or a random component (e.g., a random number). The key ID, flag, and/or random component may be considered to form an entropy tag. By way of nonlimiting example, a filename for the encrypted content 137 (e.g., an encrypted block device) may be structured as {CMS-ID}_{build-ID}_{entropy-tag}.vhdx, "CMS-ID and build-id" are identifiers for the encrypted content 137, and the entropy tag may contain a flag indicating whether the encrypted content 137 is encrypted or not, the key ID, and a random number. As such, when an authorized downstream recipient (e.g., the provision manager 160) receives the encrypted content 137, the key ID may be extracted and used to identify a corresponding private key associated with the key ID. By having some or all of this information travel securely with the content itself, there is no need for another system to track or maintain this information, which removes a potential point of attack and reduces the risk of retrieving an expired or invalid key at runtime.

As such, the content provider 120 may provide the encrypted content 137 to a desired recipient, such as a content distribution network. In the example illustrated in FIG. 1, the content provider 120 may deliver the encrypted content 137 to a component of a content distribution network (e.g., the content distributor 140), which may store the encrypted content 137 in a secure data store 145 and distribute the encrypted content 137 to (e.g., one or more availability zones, geographic zones, or other portion(s) of) one or more data centers (e.g., the data center 700 of FIG. 7) hosting at least a portion of a content distribution network, cloud-based network environment, and/or a distributed computing environment (e.g., the encrypted content 137 may be distributed to secure data store 155 in the zone 150). In some embodiments, the encrypted content 137 may represent an application such as a video game, which may be hosted in a data center and rendered scenes may be streamed to an authorized user. An example content streaming system 500 with one or more application server(s) 502 (e.g., cloud servers) which may host the application (e.g., the video game) is illustrated in FIG. 5. Generally, the content distributor 140 may distribute the encrypted content 137 using any known technique. The format of the encrypted content 137 may depend on a virtualization environment provided by the content distribution network, cloud-based network environment, and/or a distributed computing environment. For example, the encrypted content 137 (e.g., games or apps) may be delivered and/or distributed as a disk file or some other container representing a virtual data disk (e.g., a VHDx file for WINDOWS, an IMG file for LINUX) such as a block device, which may be attached to and/or mounted as a virtual disk in a virtual machine (e.g., virtual machine 170) running in the virtualization environment. These are meant simply as examples, and other types of content distribution, hosting, and virtualization techniques are contemplated within the scope of the present disclosure.

In the embodiment illustrated in FIG. 1, the zone 150 includes a provision manager 160 which may be responsible for provisioning and managing the allocation of computing resources (e.g., servers, virtual machines, network bandwidth) to support content delivery and/or streaming. In some embodiments, a request to access the encrypted content 137 (e.g., a particular game or app) may be authenticated using any known technique (e.g., based on a list of authorized applications or other content associated with a given account), and the authorized requests may be routed to the provision manager 160. As such, a runtime system with appropriate machine privilege (e.g., a key retrieval component 165 of the provision manager 160) may extract the key ID from the filename of the encrypted content 137 (e.g., of the block device) and use the key ID to access the secret store 105 and retrieve the associated private key 115. As such, the provision manager 160 may allocate a virtual machine (e.g., the virtual machine 170) to host the requested content and pass the private key 115 to the virtual machine 170 to decrypt the content-encryption key in the encrypted content 137 (or decrypt the content-encryption key and pass the decrypted content-encryption key to the virtual machine 170). As such, the virtual machine 170 may decrypt the encrypted content 137 using the decrypted content-encryption key and host the content in response to the request.

More specifically, in some embodiments, the provision manager 160 may respond to an authorized request to host, stream, or deliver content by determining whether the requested content is encrypted. For example, the filename (or other metadata) of the encrypted content 137 identified by or otherwise associated with the request may include a flag with a corresponding value(s) or character(s) indicating whether the file is encrypted. If that value(s) or character(s) is detected, the provision manager 160 may initiate decryption. Otherwise, the provision manager 160 may trigger the virtual machine 170 to host the requested content.

In some embodiments (e.g., if the provision manager 160 determines that the requested content is encrypted), the key retrieval component 165 may access or identify the encrypted content 137 in the secure data store 155 and extract the key ID from (e.g., the filename of) the encrypted content 137. For example, the filename may have a designated structure such that the key retrieval component 165 may extract the key ID from a designated position in the filename. As such, the key retrieval component 165 may use the key ID to retrieve the corresponding private key 115 from the secret store 105. In some embodiments, the key retrieval component 165 may be configured to interface with a particular secret store (e.g., the secret store 105) for all content (e.g., all files), however, this need not be the case. For example, the key ID may serve to identify a particular secret store in which the applicable key for a particular piece of content is stored (e.g., certain value(s) or character(s) of the key ID may denote a particular secret store or some other information associated with a particular secret store, such as a particular content owner).

Note that a content distribution network, cloud-based network environment, and/or distributed computing environment hosted at least partially in the zone 150 may be equipped with anti-browse protection by disabling, preventing, or otherwise suppressing a file directory listing of the files and content stored (e.g., in the secure data store 155). For example, the provision manager 160 and/or the key retrieval component 165 may be authorized to access a particular file (e.g., the encrypted content 137) in the secure data store 155 based on knowledge of the filename, its structure, or some other suitable identification method.

However, should a party who is not authorized to access this file attempt to access the secure data store 155 and browse a file directory listing, suppressing such a listing should effectively require knowledge of the filename in order to access the encrypted content 137. However, such knowledge by an unauthorized part is highly unlikely, particularly in embodiments that include a random component in the filename.

Having extracted the key ID from (e.g., the filename) of the encrypted content 137, the key retrieval component 165 may use the key ID to retrieve the corresponding private key 115 from the secret store 105. In the embodiment illustrated in FIG. 1, the key retrieval component 165 may pass the private key 115 to a decryption component 176 of the virtual machine 170 for decryption (although some other component(s) such as the provision manager 160 may perform any aspect of decryption).

In some embodiments, the decryption component 176 may extract the encrypted content-encryption key from (e.g., the metadata of) the encrypted content 137, and use the private key 115 to decrypt the encrypted content-encryption key. In some embodiments in which some additional encoding scheme is utilized to encode a representation of the (e.g., encrypted) content-encryption key, the decryption component 176 may decode that representation during a corresponding part of the decryption process. As such, the decryption component 176 may pass the decrypted content-encryption key to the content decrypter 185, which may use the content-encryption key to decrypt and host the encrypted content 137 (e.g., mount the block device or other virtual data disk represented by the encrypted content 137).

Figure 2:
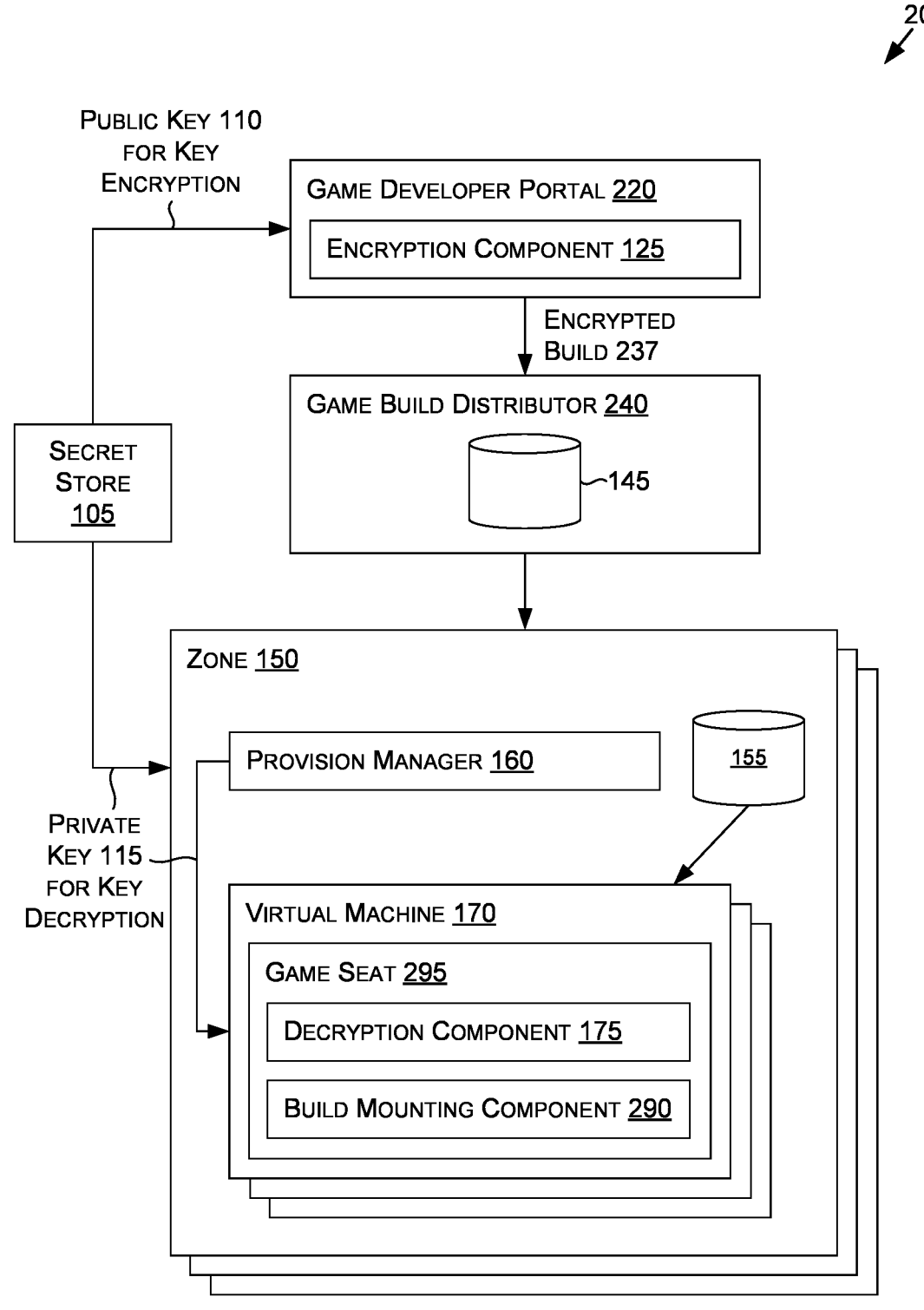
FIG. 2 is a block diagram of an example game distribution system, in accordance with some embodiments of the present disclosure.

FIG. 2 is a block diagram of an example game distribution system 200, in accordance with some embodiments of the present disclosure. In this example, the game distribution system 200 represents an example implementation of the content distribution system 100 of FIG. 1 in which the content being distributed includes game builds (e.g., development builds, alpha builds, beta builds, release candidates, gold builds, patch or update builds), and the content distribution system includes a game streaming platform (e.g., NVIDIA® GEFORCE® NOW).

In the embodiment illustrated in FIG. 2, the game distribution system 200 includes a game developer portal 220, a game build distributor 240, and any number of zones (e.g., the zone 150) that provide a virtualization environment for hosting cloud games (e.g., via a game seat 295 running on the virtual machine 170). The game developer portal 220 may be provisioned with various functionality. For example, the game developer portal 220 may provide game developers with various tools, interfaces, resources, and/or information which may be used to integrate their games into the game distribution system (e.g., the game streaming platform). The game developer portal 220 may provide access to testing environments (e.g., for game integration), analytics dashboards (e.g., to monitor game performance), technical support tools, and/or other functionality.

In some embodiments, a game developer may use the game developer portal 220 to trigger distribution of a game build (e.g., unreleased or private games, a patch, etc.) that the developer wishes to keep private. As such, the game developer portal 220 may be provisioned with the encryption component 125 such that developer input into the game developer portal 220 (e.g., instructing encryption of the game build, instructing distribution of the game build) may trigger the encryption component 125 to encrypt that build. In some embodiments, the game developer portal 220 may provide the game build to the game build distributor 240, which may be provisioned with the encryption component 125 (or some portion thereof) and used to encrypt the game build. In some embodiments, once a game build is designated for encryption, a content identifier associated with that game may be associated with an indication that the game is to be encrypted, and all new builds associated with the same content identifier may be encrypted (e.g., unless otherwise specified).

As such, regardless of whether the encryption component 125 executes on the game developer portal 220 and/or elsewhere, the encryption component 125 may encrypt a (e.g., VHDx) file representing the game build using a randomly generated content-encryption key (e.g., a randomly generated passphrase) to generate the encrypted build 237 (e.g., use its base64URL encoded representation as an input parameter to the encryption technique, for example, using VHDx encryption in BITLOCKER to generate an encrypted disk file). In some embodiments, in order to encrypt that content-encryption key, the encryption component 125 may query the secret store 105 (e.g., Vault) for a public key 110 and an associated key ID, and encrypt the content-encryption key using the public key 110. As such, the encryption component 125 may encode or otherwise attach the encrypted content-encryption key to the encrypted build 237 (e.g., by attaching its base64URL encoded string as metadata to the VHDx file). The encryption component 125 may designate the name of the file that represents the build, for example, by appending or otherwise including a flag to indicate that the (e.g., VHDx) file representing the game build is encrypted, and/or by generating and appending or otherwise including an entropy tag that contains the key ID for the key (e.g., the public key 110) used to encrypt the content-encryption key for the file and/or a random component (e.g. a random number). As such, the game developer portal 220 may provide the encrypted build 237 to the game build distributor 240 (or may provide an unencrypted build, which the game build distributor 240 may encrypt), and the game build distributor 240 may distribute the encrypted build 237 to secured storage in one or more zones (e.g., the secure data store 155 in the zone 150) hosted by the game distribution system 200 (e.g., hosted by the game streaming platform).

When the provision manager 160 is informed of an authorized request to launch the game or other content represented by the encrypted build 237 in the secure data store 155 (e.g., a request from an authorized user to launch a private game), the provision manager 160 may detect whether the encrypted build 237 is encrypted (e.g., based a flag in its filename), and if so, extract the key ID embedded in (e.g., the filename of) the encrypted build 237, retrieve the private key 115 associated with the key ID, launch a game seat 295 to host the game, and inject the private key 115 into the game seat 293 (e.g., into the seat metadata). Note that although FIG. 2 illustrates an embodiment in which the game seat 295 hosts an instance of the game for a cloud gaming user, the virtual machine 170 may additionally or alternative run other types of seats (e.g., a debug seat configured to host a debugging environment for a developer) or other services authorized to use the encrypted build 237.

FIG. 2 illustrates an embodiment in which the game seat 295 is provisioned with the decryption component 175, which may extract and/or decode the encrypted content-encryption key from (e.g., the metadata of) the encrypted build 237, and use the private key 115 to decrypt the encrypted content-encryption key. As such, a build mounting component 290 may inject the decrypted content-encryption key into the operating system running in the game seat 295, which allows the encrypted build 237 (e.g., the encrypted block device) to be mounted and its data (e.g., blocks) to be decrypted as they are being read. As such, the game seat 295 may decrypt, attach, and mount the encrypted build 237. Accordingly, the game seat 295 may access, run, and host the game.

Figure 3:
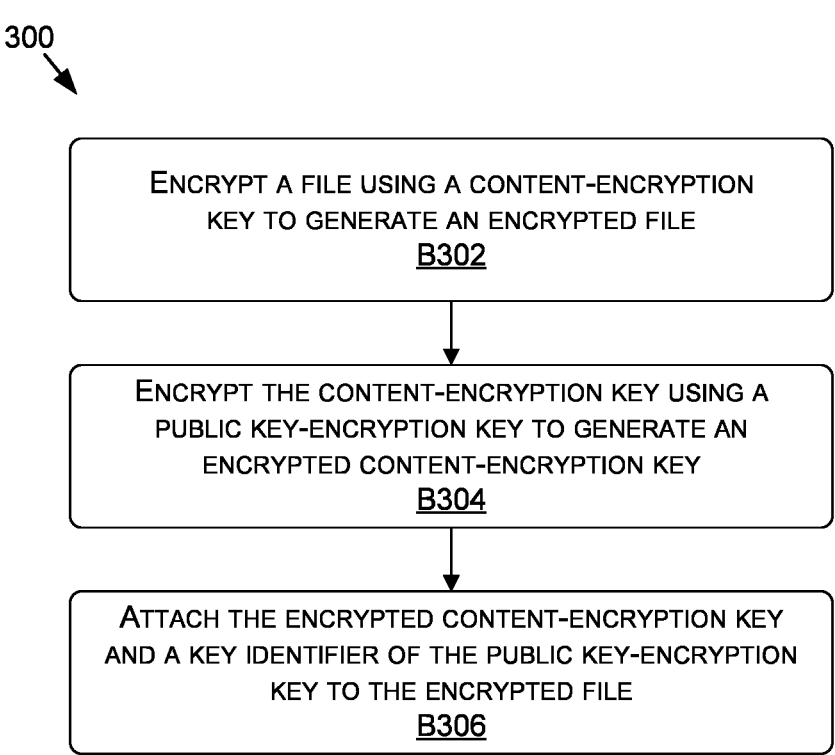
FIG. 3 is a flow diagram illustrating a method of content encryption, in accordance with some embodiments of the present disclosure.

Now referring to FIGS. 3 and 4, each block of methods 300 and 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, the methods 300 and 400 may be described, by way of example, with respect to the content distribution system 100 of FIG. 1 and/or the game distribution system 200 of FIG. 2. However, these methods may additionally or alternatively be executed by any one system, or any combination of systems, including, but not limited to, those described herein.

FIG. 3 is a flow diagram illustrating a method 300 of content encryption, in accordance with some embodiments of the present disclosure. The method 300, at block B302, includes encrypting a file using a content-encryption key to generate an encrypted file. For example, with respect to the content distribution system 100 of FIG. 1, the encryption component 125 (e.g., the content encrypter 130) may generate a random content-encryption key (e.g., as a random number, passphrase, salt, or other random data) and use the content-encryption key to encrypt a file such as a text file, audio file, video file, disk file, compressed file, application file, and/or other type of file. Taking an example scenario in which the file is a disk file representing a virtual data disk (e.g., a VHDx or IMG file), the content encrypter 130 may encrypt the disk file to generate an encrypted disk file (e.g., representing an encrypted block device or other encrypted virtual disk). With respect to the game distribution system 200 of FIG. 2, the encryption component 125 may encrypt a (e.g., VHDx) file representing a game build using a randomly generated content-encryption key (e.g., a randomly generated passphrase) to generate the encrypted build 237 (e.g., use its base64URL encoded representation as an input parameter to the encryption technique, for example, using VHDx encryption in BITLOCKER to generate an encrypted disk file).

The method 300, at block B304, includes encrypting the content-encryption key using a public key-encryption key to generate an encrypted content-encryption key. For example, with respect to the content distribution system 100 of FIG. 1, the encryption component 125 (e.g., the content key encrypter 135) may trigger the secret store 105 (e.g., Vault) to generate a public-private key pair and/or retrieve the public key 110 for key encryption, and may use the public key 110 to encrypt the content-encryption key that was used to encrypt the encrypted content 137.

The method 300, at block B306, includes attaching (encoding) the encrypted content-encryption key and a key identifier of the public key-encryption key to the encrypted file. For example, with respect to the content distribution system 100 of FIG. 1, the encryption component 125 may encode or otherwise attach a representation of the encrypted content-encryption key (e.g., an encoded version generated by the encryption component 125, for example, using base64URL or some other kind of encoding scheme) to the encrypted content 137 (e.g., as metadata), and may encode or otherwise attach the key ID for the public key 110 used to encrypt the content-encryption key for the encrypted content 137 to the filename (or metadata) of the encrypted content 137. With respect to the game distribution system 200 of FIG. 2, the encryption component 125 may encode or otherwise attach the encrypted content-encryption key to the encrypted build 237 (e.g., by encoding its base64URL encoded string as metadata to the VHDx file), and may generate or update the filename of the encrypted build 237 to include (e.g., an entropy tag that contains) the key ID for the key (e.g., the public key 110) used to encrypt the content-encryption key for the encrypted build 237.

FIG. 4 is a flow diagram illustrating a method 400 of content decryption, in accordance with some embodiments of the present disclosure. The method 400, at block B402, includes retrieving a private key-encryption key associated with a key identifier in an encrypted file. For example, with respect to the content distribution system 100 of FIG. 1, the key retrieval component 165 may access or identify the encrypted content 137 in the secure data store 155, extract the key ID from (e.g., the filename of) the encrypted content 137, and use the key ID to retrieve the corresponding private key 115 from the secret store 105. With respect to the game distribution system 200 of FIG. 2, when the provision manager 160 is informed of an authorized request to launch a game or other content represented by the encrypted build 237 in the secure data store 155 (e.g., a request from an authorized cloud gaming user to launch a private game), the provision manager 160 may extract the key ID embedded in (e.g., the filename of) the encrypted build 237, and retrieve the private key 115 associated with the key ID.

The method 400, at block B404, includes extracting an encrypted content-encryption key from the encrypted file, and the method 400, at block B406, includes decrypting the encrypted content-encryption key using the private key-encryption key to generate a decrypted content-encryption key. For example, with respect to the content distribution system 100 of FIG. 1, the key retrieval component 165 may pass the private key 115 to the decryption component 176 of the virtual machine 170, and the decryption component 176 may extract the encrypted content-encryption key from (e.g., the metadata of) the encrypted content 137 and use the private key 115 to decrypt the encrypted content-encryption key. With respect to the game distribution system 200 of FIG. 2, the game seat 295 (e.g., the decryption component 175) may extract and/or decode the encrypted content-encryption key from (e.g., the metadata of) the encrypted build 237, and use the private key 115 to decrypt the encrypted content-encryption key.

The method 400, at block B408, includes decrypting the encrypted file using the decrypted content-encryption key. For example, with respect to the content distribution system 100 of FIG. 1, the decryption component 176 may pass the decrypted content-encryption key to the content decrypter 185, which may use the content-encryption key to decrypt the encrypted content 176. With respect to the game distribution system 200 of FIG. 2, the build mounting component 290 may inject the decrypted content-encryption key into the operating system running in the game seat 295, which may mount the encrypted build 237 (e.g., the encrypted block device) and decrypt its data (e.g., blocks) as it is read.

Example Content Streaming System

Now referring to FIG. 5, FIG. 5 is an example system diagram for a content streaming system 500, in accordance with some embodiments of the present disclosure. FIG. 5 includes application server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may support an application session corresponding to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 500, for an application session, the client device(s) 504 may only receive input data in response to inputs to the input device(s), transmit the input data to the application server(s) 502, receive encoded display data from the application server(s) 502, and display the display data on the display 524. As such, the more computationally intense computing and processing may be offloaded to the application server(s) 502 (e.g., rendering—in particular ray or path tracing—for graphical output of the application session may be executed by GPU(s) of the application server(s) 502, such as a game server(s)). In other words, the application session may be streamed to the client device(s) 504 from the application server(s) 502, thereby reducing the requirements of the client device(s) 504 for graphics processing and rendering.

For example, with respect to an instantiation of an application session, a client device 504 may be displaying a frame of the application session on the display 524 based on receiving the display data from the application server(s) 502. The client device 504 may receive an input to one of the input device(s) and generate input data in response. The client device 504 may transmit the input data to the application server(s) 502 via the communication interface 520 and over the network(s) 506 (e.g., the Internet), and the application server(s) 502 may receive the input data via the communication interface 518. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 512 may render the application session (e.g., representative of the result of the input data) and the render capture component 514 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 502. In some embodiments, one or more virtual machines (VMs)—e.g., including one or more virtual components, such as vGPUs, vCPUs, etc.—may be used by the application server(s) 502 to support the application sessions. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

One possible application in which the present techniques may be used is in cloud gaming. Cloud gaming, also known as game streaming or cloud gaming services, hosts video games on remote servers located in data centers. These servers are typically equipped with high-performance graphics cards and CPUs, serving as the infrastructure where the games are installed and run. Users may access and play games through client software or apps on their devices such as low-end PCs, smartphones, tablets, and smart TVs. When a user selects a game, a request may be sent to a cloud server hosting that specific title. An instance of the game runs on the server, and the video and audio output may be encoded in real-time and streamed to the user's device. User input, such as keyboard, mouse, or controller commands, may be transmitted to the cloud server, which may process these inputs and updates the game accordingly, creating a responsive gaming experience. The quality of the game stream, including resolution and frame rate, typically depends on the user's internet connection speed and the capabilities of the user's device. This approach reduces or eliminates the need for users to own and maintain high-end gaming hardware and allows them to enjoy gaming experiences on devices that may not have the processing power to run the games locally.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models—such as one or more large language models (LLMs), systems for performing light transport simulation, systems for performing collaborative content creation for 3D assets, systems implemented at least partially using cloud computing resources, and/or other types of systems.

Example Computing Device

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
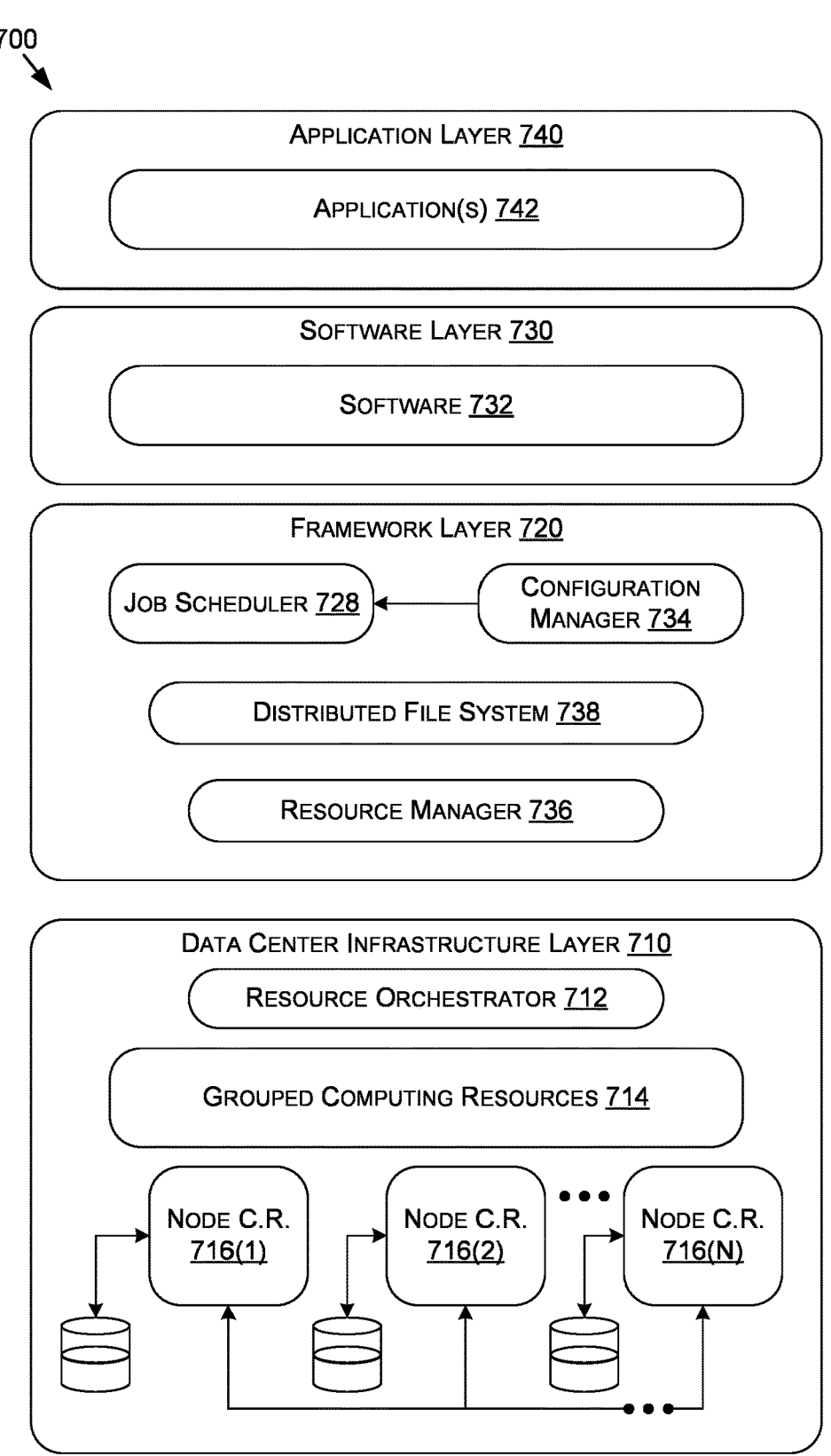
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 728, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 728 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 728. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more hardware processors comprising processing circuitry to:
encrypt a file using a content-encryption key to generate an encrypted file;
encrypt the content-encryption key using a public key-encryption key to generate an encrypted content-encryption key; and
encode, in association with the encrypted file, the encrypted content-encryption key and a key identifier that uniquely identifies a private key-encryption key corresponding to the public key-encryption key.

2. The one or more hardware processors of claim 1, wherein the processing circuitry is further to generate the content-encryption key using a random value generator.

3. The one or more hardware processors of claim 1, wherein the processing circuitry is further to encode the encrypted content-encryption key as metadata corresponding to the encrypted file.

4. The one or more hardware processors of claim 1, wherein the processing circuitry is further to encode the key identifier in association with the encrypted file based at least on appending the key identifier to a filename of the encrypted file.

5. The one or more hardware processors of claim 1, wherein the processing circuitry is further to encode the key identifier in association with the encrypted file based at least on appending an entropy tag comprising the key identifier and a random component to a filename of the encrypted file.

6. The one or more hardware processors of claim 1, wherein the processing circuitry is further to provide the encrypted file to a data distribution network.

7. The one or more hardware processors of claim 1, wherein the encrypted file is an encrypted disk file representing an encrypted game build encrypted by a game developer, and the processing circuitry is further to provide the encrypted game build via a developer portal to a game streaming platform.

8. The one or more hardware processors of claim 1, wherein the encrypted file is an encrypted disk file representing an encrypted build of a software application.

9. The one or more hardware processors of claim 1, wherein the one or more hardware processors are comprised in at least one of:

a system for performing simulation operations;

a system for performing digital twin operations;

a system for performing light transport simulation;

a system for performing deep learning operations;

a system for performing real-time streaming;

a system for generating or presenting one or more of augmented reality content, virtual reality content, or mixed reality content;

a system implemented using an edge device;

a system implemented using a robot;

a system for generating synthetic data;

a system for generating synthetic data using AI;

a system incorporating one or more virtual machines (VMs);

a system implemented at least partially in a data center; or a system implemented at least partially using cloud computing resources.

10. A system comprising one or more hardware processors to encode an entropy tag comprising a key identifier of a key-encryption key in association with an encrypted file, the key-encryption key being used to encrypt a content-encryption key for the encrypted file.

11. The system of claim 10, wherein the one or more hardware processors are further to generate the content-encryption key using a random value generator.

12. The system of claim 10, wherein the one or more hardware processors are further to generate an encrypted content-encryption key based at least on encrypting the content-encryption key using the key-encryption key and encode the encrypted content-encryption key in association with the encrypted file as metadata corresponding to the encrypted file.

13. The system of claim 10, wherein the one or more hardware processors are further to encode the key identifier in association with the encrypted file based at least on appending the key identifier to a filename of the encrypted file.

14. The system of claim 10, wherein the one or more hardware processors are further to encode the key identifier in association with the encrypted file based at least on appending the entropy tag comprising the key identifier and a random component to a filename of the encrypted file.

15. The system of claim 10, wherein the one or more hardware processors are further to provide the encrypted file to a data distribution network.

16. The system of claim 10, wherein the encrypted file is an encrypted disk file representing an encrypted application build encrypted by an application developer, and the one or more hardware processors are further to provide the encrypted application build via a developer portal to a cloud content distribution platform.

17. The system of claim 10, wherein the encrypted file is an encrypted disk file representing an encrypted application build encrypted by a cloud content distribution platform.

18. The system of claim 10, wherein the system is comprised in at least one of:

a system for performing simulation operations;

a system for performing digital twin operations;

a system for performing light transport simulation;

a system for performing deep learning operations;

a system for performing real-time streaming;

a system for generating or presenting one or more of augmented reality content, virtual reality content, or mixed reality content;

a system implemented using an edge device;

a system implemented using a robot;

a system for generating synthetic data;

a system for generating synthetic data using AI;

a system incorporating one or more virtual machines (VMs);

a system implemented at least partially in a data center; or a system implemented at least partially using cloud computing resources.

19. A method comprising:

generating an encrypted file using a content-encryption key;

generating an encrypted content-encryption key based at least on encrypting the content-encryption key using a key-encryption key; and encoding the encrypted content-encryption key and an entropy tag comprising a key identifier of the key-encryption key in association with the encrypted file.

20. The method of claim 19, wherein the method is performed by at least one of:

a system for performing simulation operations;

a system for performing digital twin operations;

a system for performing light transport simulation;

a system for performing deep learning operations;

a system for performing real-time streaming;

a system for generating or presenting one or more of augmented reality content, virtual reality content, or mixed reality content;

a system implemented using an edge device;

a system implemented using a robot;

a system for generating synthetic data;

a system for generating synthetic data using AI;

a system incorporating one or more virtual machines (VMs);

a system implemented at least partially in a data center; or a system implemented at least partially using cloud computing resources.

* * * * *